(12) United States Patent
Feng

(10) Patent No.: US 11,147,417 B2
(45) Date of Patent: Oct. 19, 2021

(54) KAMADO GRILL WITH POSITIONING TELESCOPIC RAM

(71) Applicant: Fu-Du Feng, Taipei (TW)

(72) Inventor: Fu-Du Feng, Taipei (TW)

( * ) Notice: Subject to any disclaimer, the term of this patent is extended or adjusted under 35 U.S.C. 154(b) by 117 days.

(21) Appl. No.: 16/811,825

(22) Filed: Mar. 6, 2020

(65) Prior Publication Data

US 2020/0281405 A1 Sep. 10, 2020

Related U.S. Application Data

(60) Provisional application No. 62/815,532, filed on Mar. 8, 2019.

(51) Int. Cl.
*A47J 37/07* (2006.01)
*F24C 15/02* (2006.01)

(52) U.S. Cl.
CPC ....... *A47J 37/0786* (2013.01); *A47J 37/0704* (2013.01); *F24C 15/023* (2013.01)

(58) Field of Classification Search
CPC .... A47J 37/07; A47J 37/0796; A47J 37/0704; F24C 15/02; F24C 15/023
See application file for complete search history.

(56) References Cited

U.S. PATENT DOCUMENTS

| 6,581,587 B1 * | 6/2003 | Helms | A47J 36/12 |
| | | | 110/178 |
| 2014/0021314 A1 * | 1/2014 | Bourlier | A47J 37/0786 |
| | | | 248/225.11 |

FOREIGN PATENT DOCUMENTS

CN 212630604 U * 3/2021

* cited by examiner

*Primary Examiner* — David J Laux
*Assistant Examiner* — Nikhil P Mashruwala
(74) *Attorney, Agent, or Firm* — Juan Carlos A. Marquez; Marquez IP Law Office, PLLC

(57) ABSTRACT

The present invention is a kamado grill with a positioning telescopic rain comprising a grill body, a cover hinge comprising: a lower bracket fixed on one side of the grill body and having a first joint end and at least one restriction slot; an upper bracket combined with the lower bracket through a rotating shaft and having a second joint end and at least one restriction unit slidably disposed in the restriction slot; a positioning telescopic rain combined with the first joint end and the second joint end; and a ceramic cover which completes the opening or closing by the cover hinge. With the implementation of the present invention, users can smoothly or effortlessly complete the opening or closing operation of the ceramic cover at any angle even in a low temperature and cold climates.

4 Claims, 8 Drawing Sheets

KAMADO GRILL WITH POSITIONING TELESCOPIC RAM

BACKGROUND OF THE INVENTION

1. Technical Field

This present invention relates to a kamado grill with a positioning telescopic rain, especially a kamado grill with a positioning telescopic rain for food grilling for outdoor parties.

2. Description of Related Art

Barbecue party has become a social entertainment for gathering together. In modern society, barbecue methods have gradually diversified, and various barbecue grills, barbecue racks, barbecue sauces have been developed. On a holiday or festival, the whole family or several families will go on a picnic or go camping together, in order to grill the most delicious food, the kamado grill is the best choice.

However, the food tastes better when grilled with a kamado grill, but the kamado grill is very heavy because it is kilned from china clay. The weight of the ceramic cover 30 is sometimes 30 to 50 kilograms, it is not easy to open the ceramic cover of the kamado grill when grilling, and it is dangerous due to improper operation.

As shown in FIG. 1, the conventional kamado grill P100, the grill body 10 and the ceramic cover 30 are combined by a hinge P20 having a shaft 40. Such a structure is usually very laborious to use, therefore, most of the ceramic cover 30 can only be opened or closed by men. In addition, because there is no multi-position positioning function, when the ceramic cover 30 is opened, the ceramic cover 30 cannot be opened and positioned in a small opening to allow the hot air to escape first, when the ceramic cover 30 is opened, the user is easily burned by the hot air.

SUMMARY OF THE INVENTION

The present invention provides a kamado grill with a positioning telescopic rain, which mainly solves the problem that when the kamado grill is used, the ceramic cover is too heavy to open or close smoothly and effortlessly at any positioning angle, especially in low temperature and cold climates.

The present invention provides a kamado grill with a positioning telescopic rain, comprising: a grill body which is a bowl-shaped structure having a first hollow portion and a bottom side opening on the sidewall of the grill body; a cover hinge, comprising: a lower bracket fixed on one side of the grill body and having a first joint end and at least one restriction slot; an upper bracket combined with the lower bracket through a rotating shaft, having a second joint end, and having at least one restriction unit slidably disposed in the at least one restriction slot; a positioning telescopic rain, comprising: a hydraulic rain having a hydraulic cylinder body having a first joint portion movably connected to the first joint end and a telescopic rod having a second joint portion movably connected d to the second joint end; a damping cup ringed on the telescopic rod and being adjacent to the hydraulic cylinder body; and a spring having two ends sleeved between the second joint end and the damping cup by support of two washers; and a ceramic cover having one end integrated with the upper bracket, then the cover hinge used to complete the multiple opening or closing positioning of the ceramic cover.

Implementation of the present invention at least provides the following advantageous effects:
1. The opening and closing of the heavy ceramic cover can be completed with less effort.
2. The ceramic cover can be opened or closed smoothly or effortlessly in low temperature and cold climates.
3. The ceramic cover can be supported continuously and durably at a certain angle.
4. People can avoid being burned by hot air when opening the ceramic cover.
5. The effect of positioning the ceramic cover at any angle can be achieved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
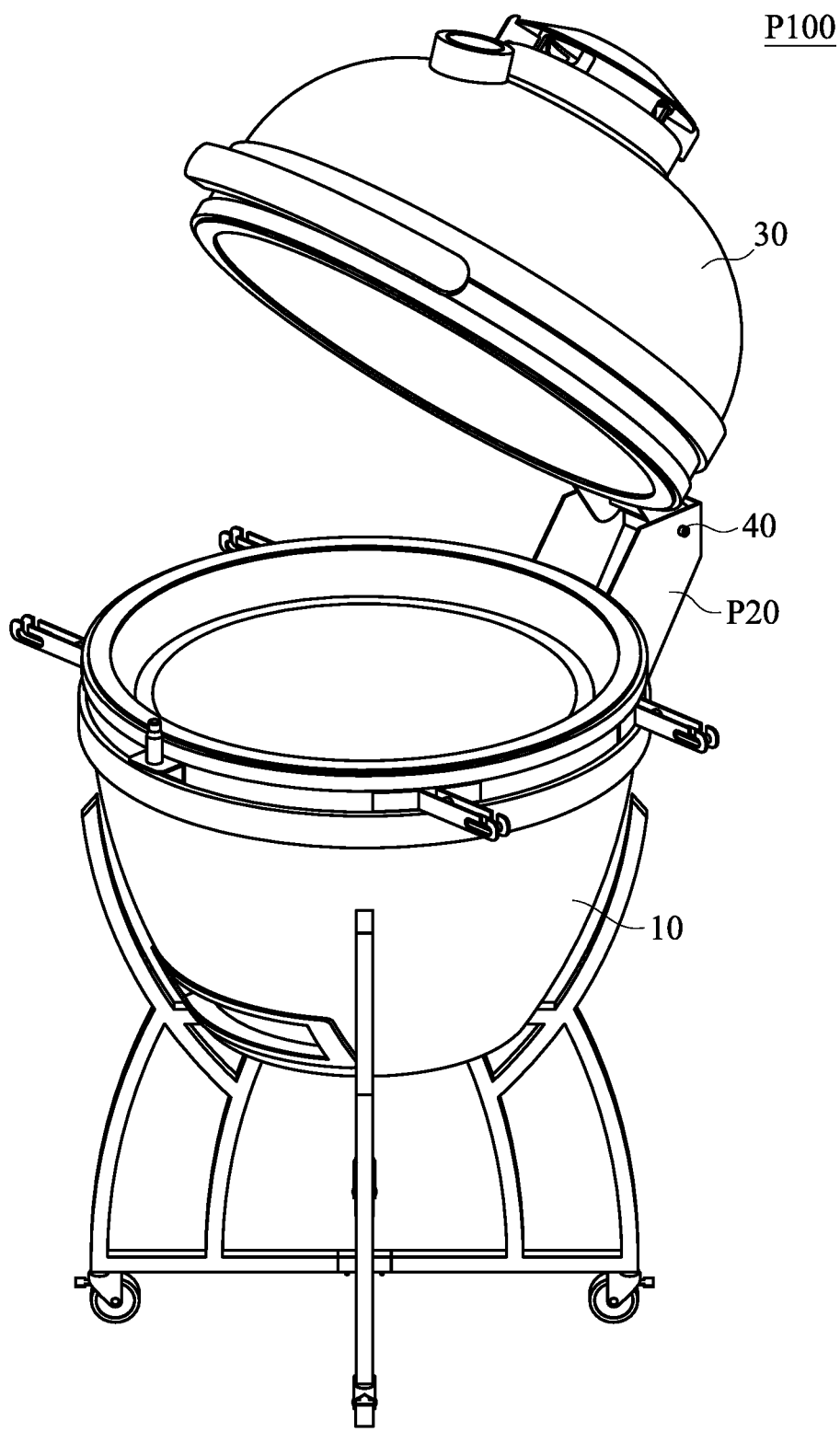
FIG. 1 is a schematic drawing showing a conventional kamado grill.
Figure 2A:
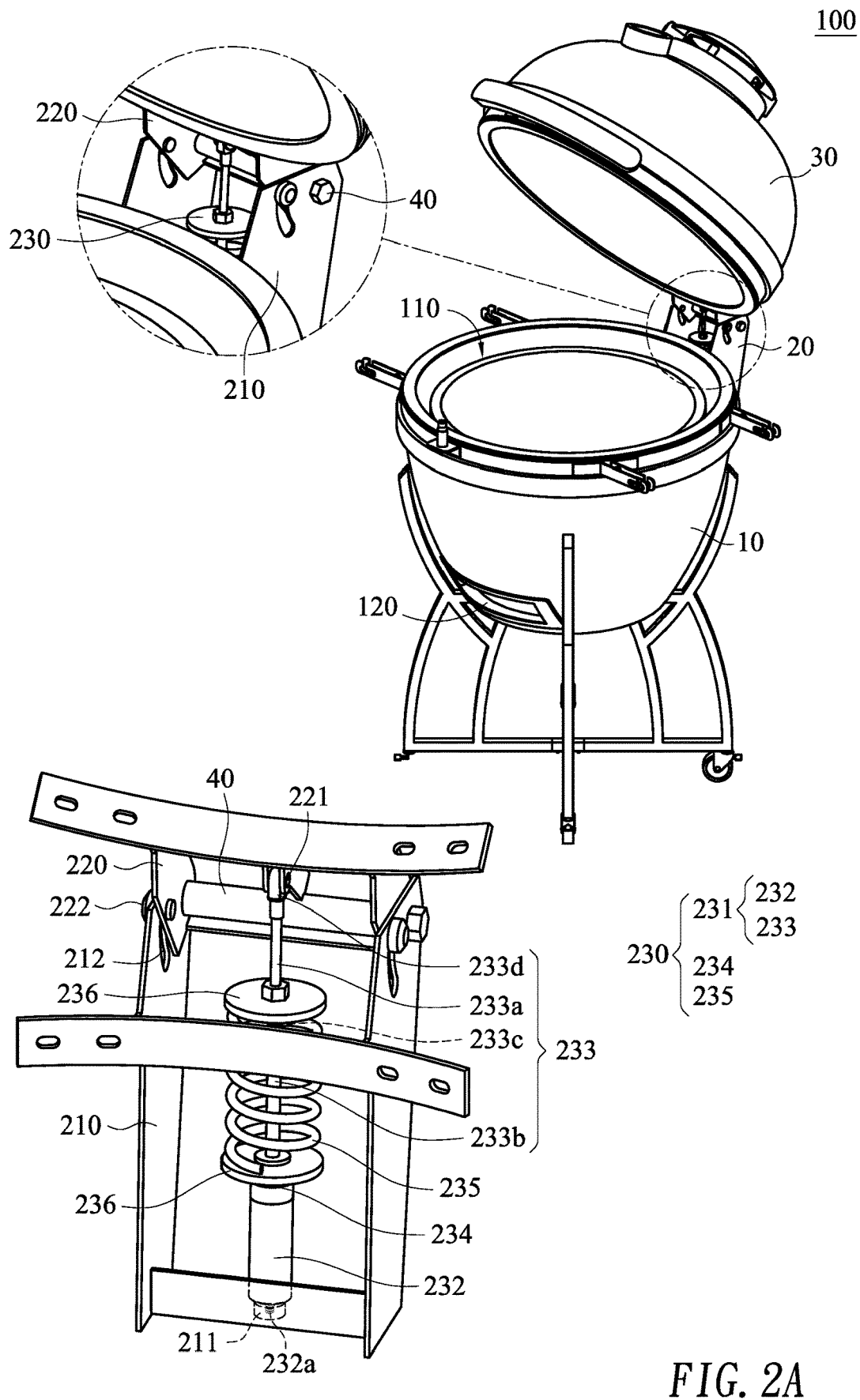
FIG. 2A is a schematic drawing showing an embodiment of a kamado grill with a positioning telescopic rain of the present invention.
Figure 2B:
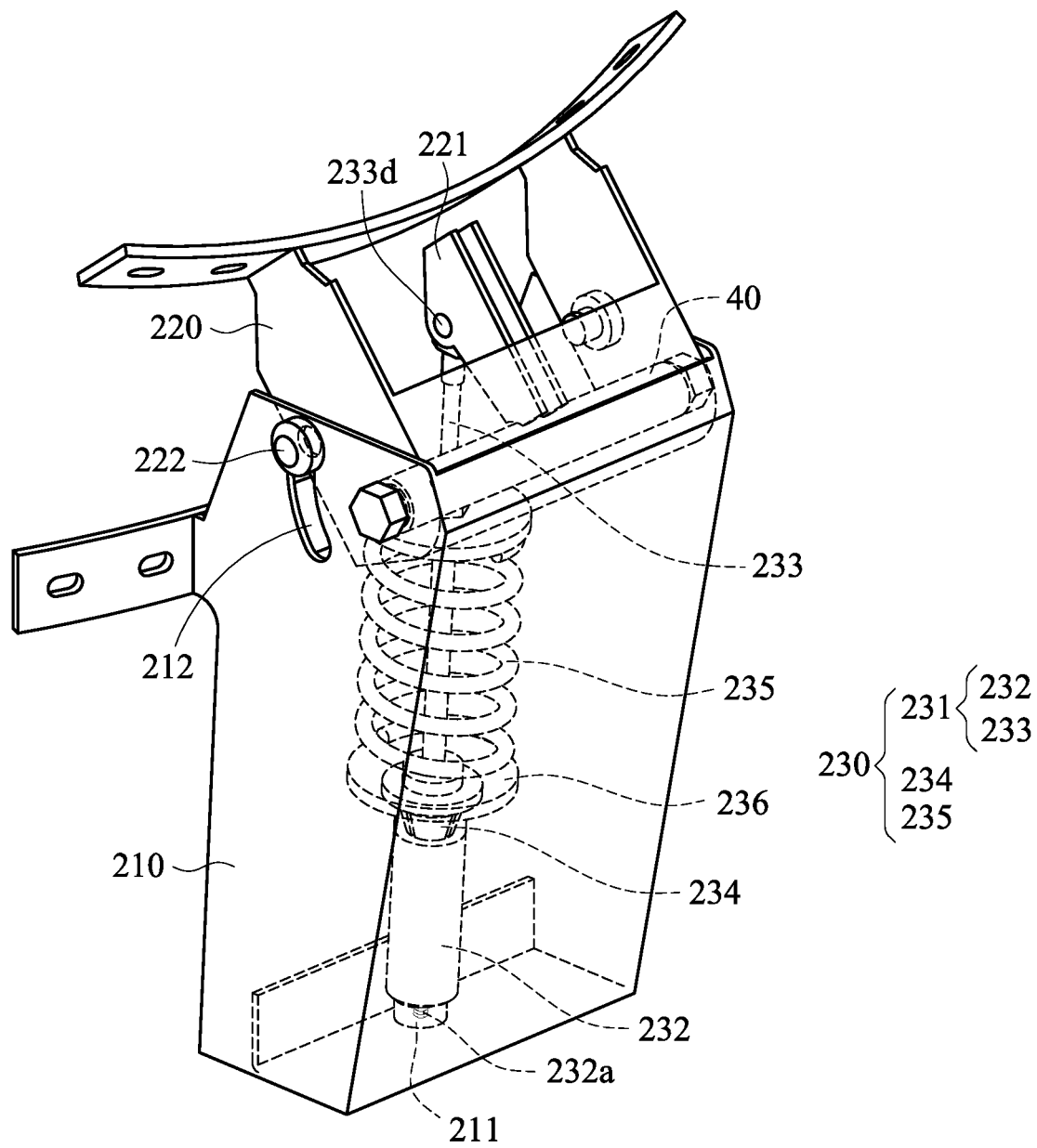
FIG. 2B is a schematic drawing showing an embodiment of a cover hinge of the present invention.
Figure 3A:
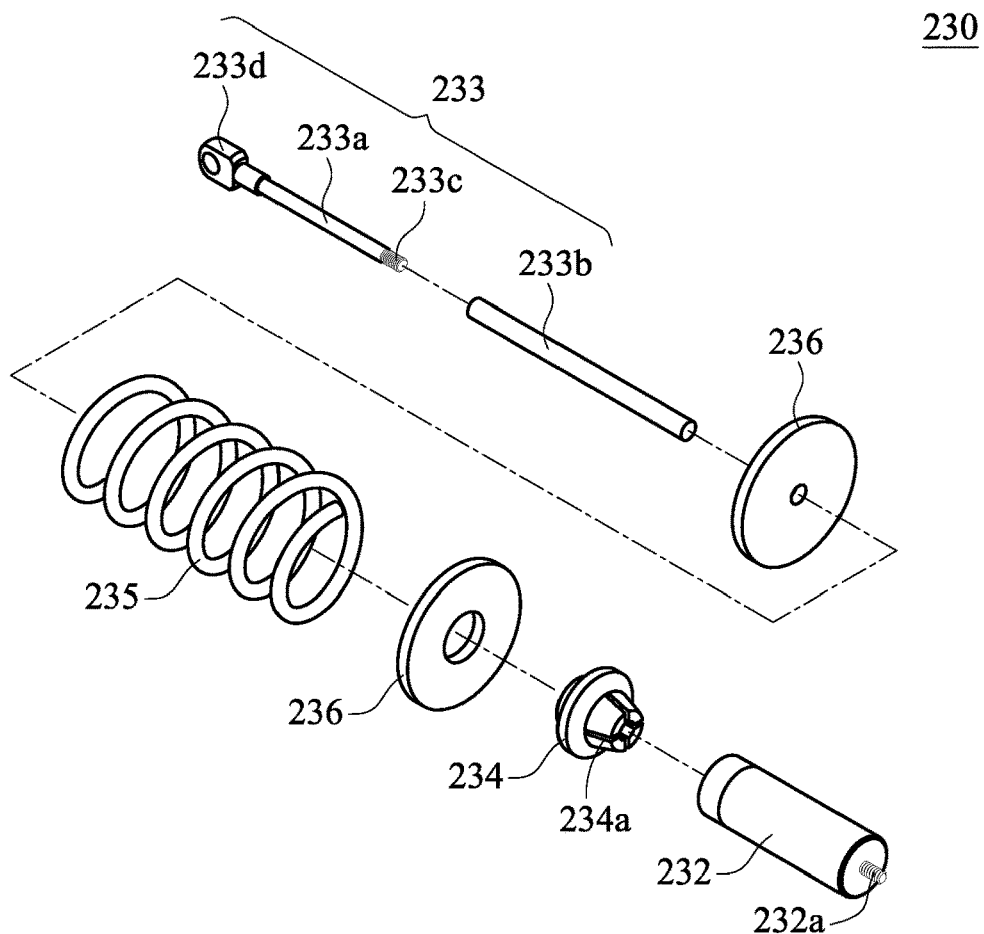
FIG. 3A is an explosion schematic drawing showing an embodiment of a positioning telescopic rain of the present invention.
Figure 3B:
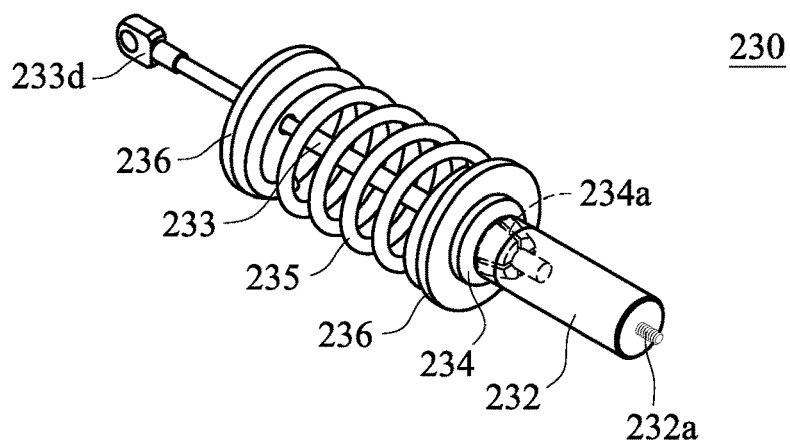
FIG. 3B is a perspective schematic drawing showing an embodiment of a positioning telescopic rain of the present invention.
Figure 4A:
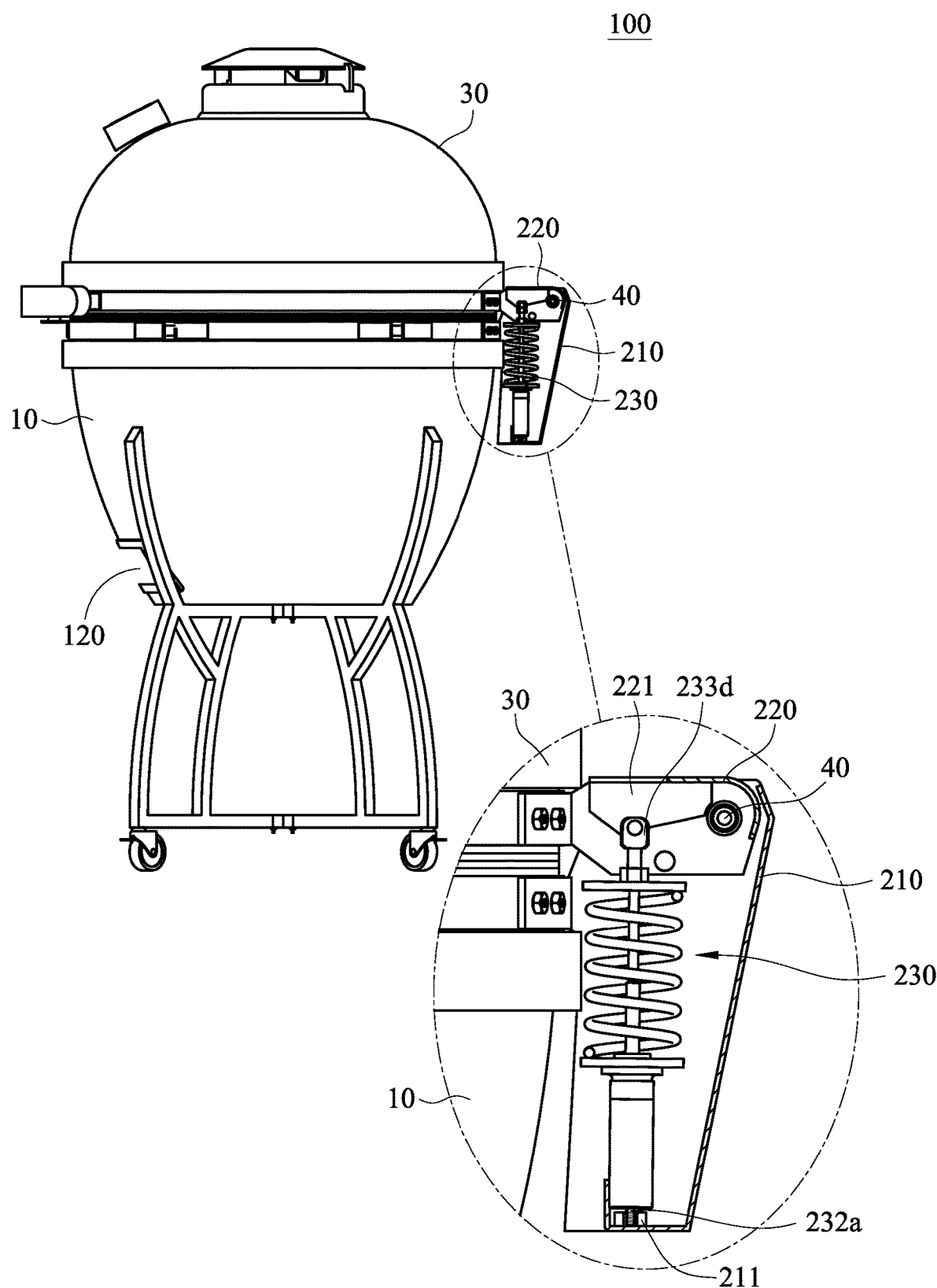
FIG. 4A is a schematic drawing showing an embodiment of the state of the ceramic cover is closed of the present invention.
Figure 4B:
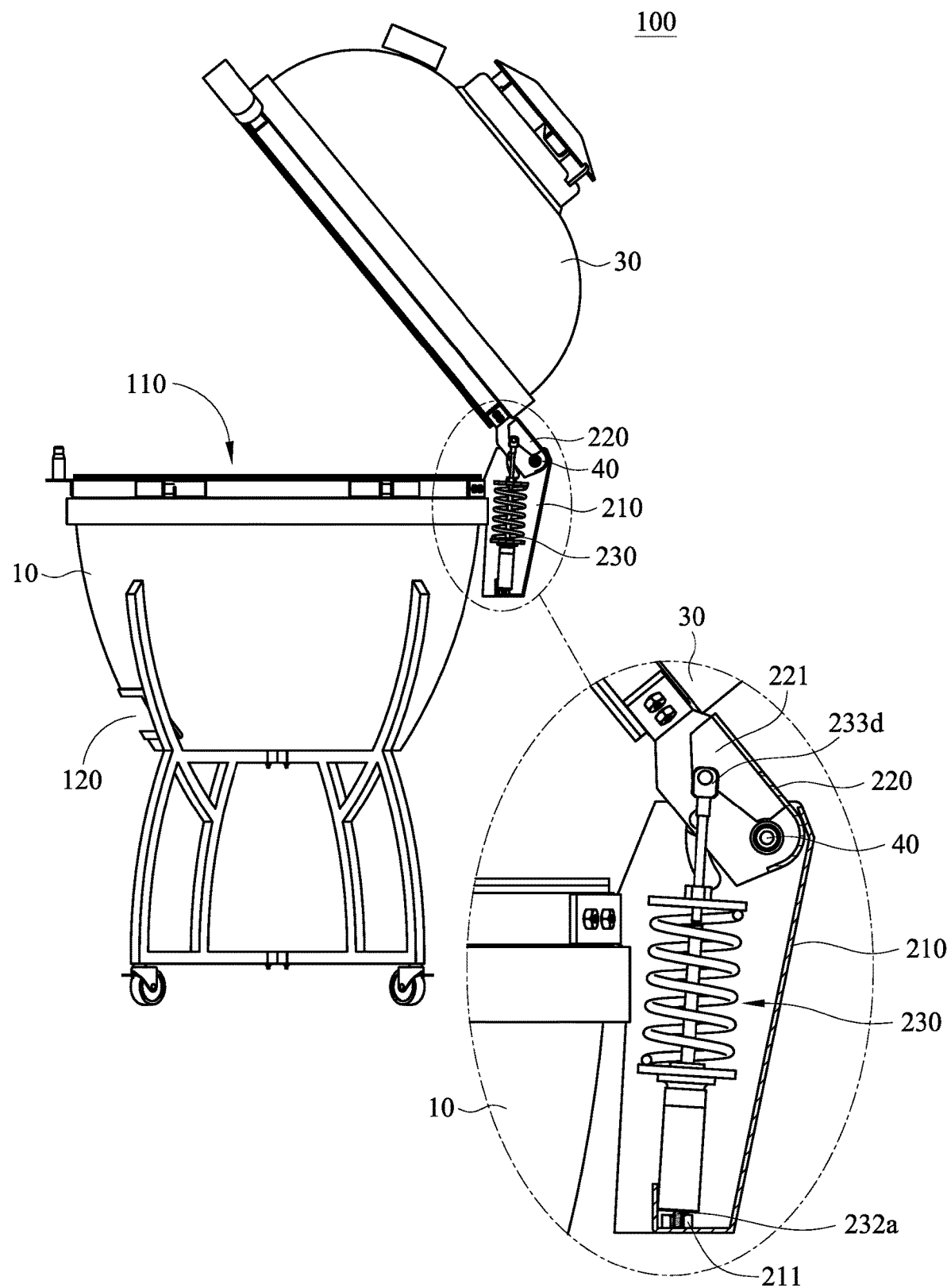
FIG. 4B is a schematic drawing showing an embodiment of the state of the ceramic cover is opened of the present invention.

As shown in FIG. 2A-2B, an embodiment of a kamado grill 100 with a positioning telescopic rain according to the present invention comprises a grill body 10, a cover hinge 20, and a ceramic cover 30. The grill body 10 and the ceramic cover 30 are especially kilned from china clay and have the characteristics of heavy, thick, good thermal insulation effect.

The grill body 10 is a bowl-shaped structure having a first hollow portion 110 and the sidewall of the grill body 10 has a bottom side opening 120.

The cover hinge 20 comprises a lower bracket 210; an upper bracket 220; and a positioning telescopic rain 230. The cover hinge 20 is a labor-saving structure for opening or closing the ceramic cover 30.

The lower bracket 210 can be a metal piece and is fixed on one side of the grill body 10. The lower bracket 210 has a first joint end 211 conveniently combined with the positioning telescopic rain 230 and at least one restriction slot 212 to control the maximum opening angle when the ceramic cover 30 is opened.

The upper bracket 220 can also be a metal piece. The upper bracket 220 is fixed on one side of the ceramic cover 30 and combined with the lower bracket 210 through a rotating shaft 40. The upper bracket 220 has a second joint end 221 for conveniently combined with the positioning telescopic rain 230 and at least one restriction unit 222 slidably disposed in the at least one restriction slot 212. The restriction unit 222 may be, for example, a rod body and fits with the length of the restriction slot 212 to control the maximum opening angle of the ceramic cover 30 when the ceramic cover 30 is opened.

As shown in FIG. 2A-3B, the positioning telescopic rain 230 comprises a hydraulic rain 231; a damping cup 234; and a spring 235.

The hydraulic rain 231, for example a telescopic cylinder or an air spring, has a hydraulic cylinder body 232 and a telescopic rod 233. The hydraulic cylinder body 232 has a first joint portion 232a and the first joint portion 232a is movably connected to the first joint end 211. The telescopic rad 233 has a second joint portion 233d and the second joint portion 233d is movably connected to the second joint end 221.

In order to effectively adjust the extension distance, the telescopic rod 233 can be designed to have a first telescopic portion 233a and a second telescopic portion 233b. The first telescopic portion 233a and the second telescopic portion 233b can be screwed into one. For effectively adjust the extension distance of the telescopic rod 233, the second telescopic portion 233b can combine with the first telescopic portion 232a by screw thread 233c in rotation and telescopic manner.

The damping cup 234 is ringed on the telescopic rad 233 and adjacent to the hydraulic cylinder body 232. The damping cup 234 can be an elastic structure, such as rubber or silicon, and/or made of the polymer materials. The frictional force is generated by the damping cup 234 ringed on the telescopic rod 233 to generate the damping effect. In addition, the damping cup 234 may have a plurality of incisions 234a, so the clamping or releasing process of the telescopic rad 233 on the damping cup 234 can be made smoother.

The spring 235 has two ends sleeved between the second joint end 221 and the damping cup 234 by support of two washers. The spring 235 cooperates with the hydraulic rain 231 to expand and contract, then the spring 235 can not only share the force of the heavy ceramic cover 30 with hydraulic rain 231, but also increase the service life of the hydraulic rain 231 and maintain the effectiveness of the hydraulic rain 231 at low temperatures.

When the ceramic cover 30 is closed downward by the user, then the telescopic rod 233 will be pressed down and down into the damping cup 234 d and after the telescopic rod 233 stops, then the telescopic rod 233 will be held by the damper cup 234, so the ceramic cover 30 can produce positioning effect at any position. When the ceramic cover 30 is lifted upwards by the user, then the telescopic rod 233 will be pulled upward from the damping cup 234 and after the telescopic rod 233 stops, then the telescopic rod 233 will be held by the damper cup 234, so the ceramic cover 30 can produce positioning effect at any position again.

Figure 5A:
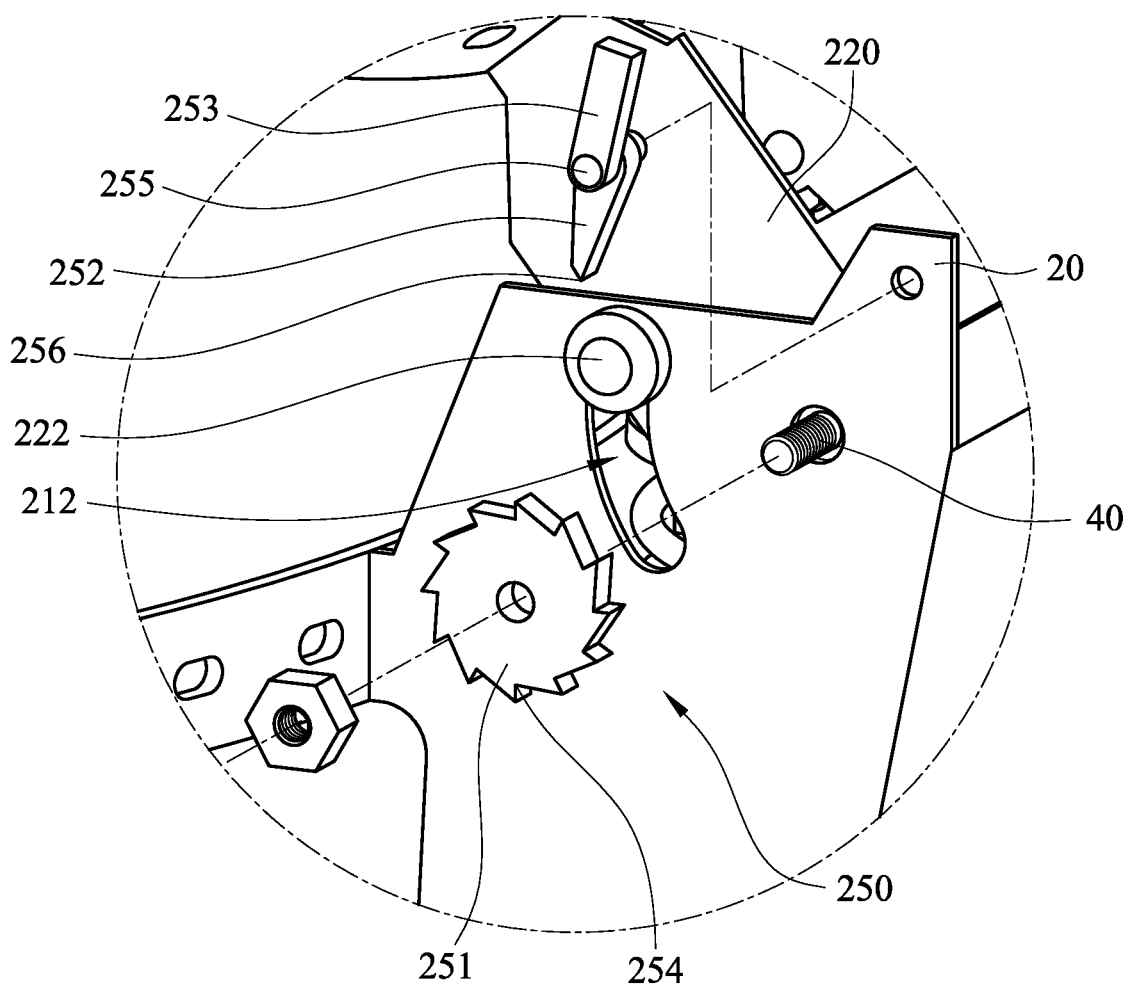
FIG. 5A is an exploded schematic drawing showing an embodiment of a positioning module of the present invention.
Figure 5B:
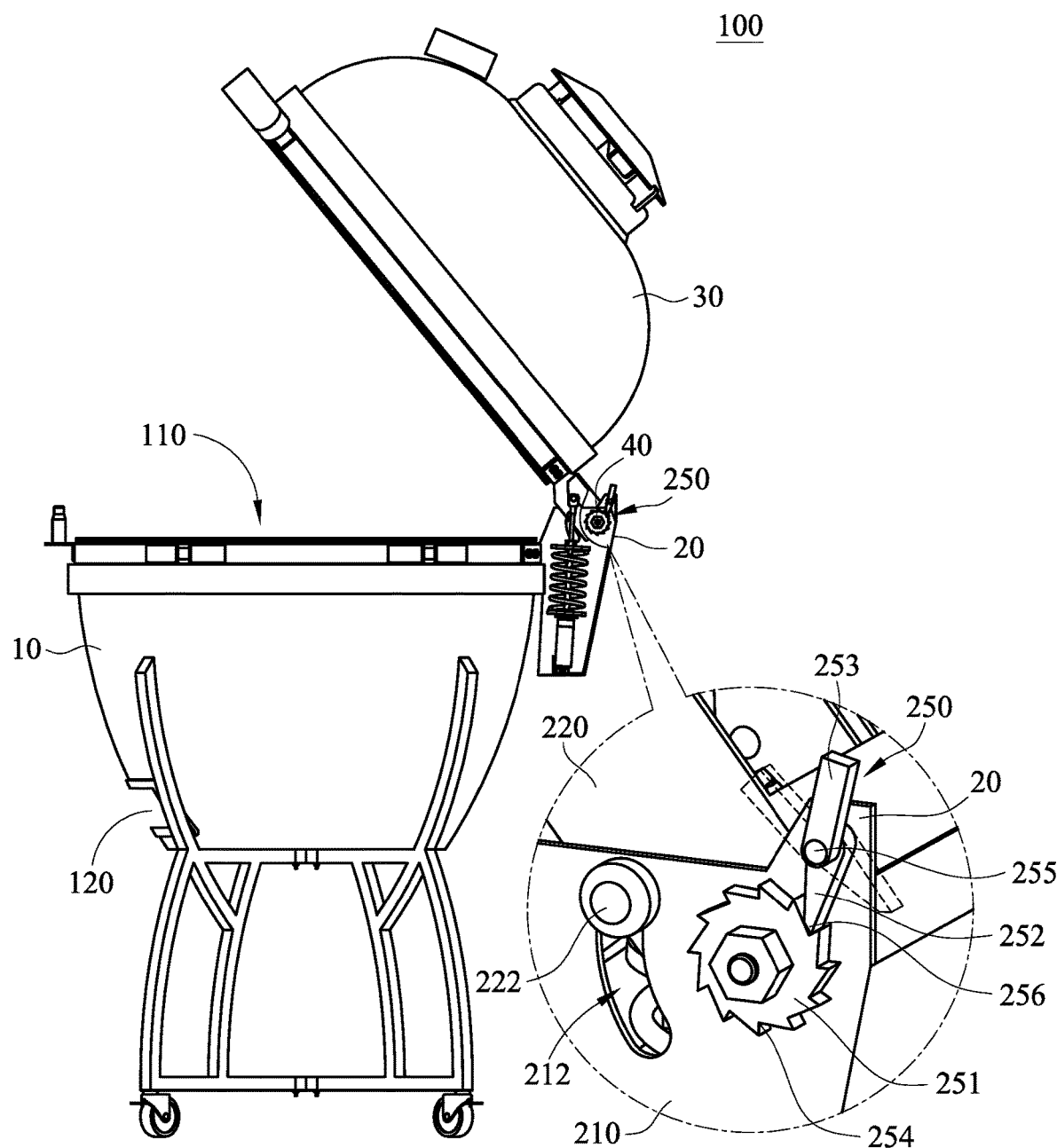
FIG. 5B is a perspective schematic drawing showing an embodiment of a positioning module of the present invention.

As shown in FIGS. 5A and 5B, the cover hinge 20 may further has a positioning module 250 which is used for the heavy ceramic cover 30 to effectively fix ceramic cover 30 at a specific angle during the opening or closing process and used to avoid the positioning telescopic rain 230 continuously supporting the heavy ceramic cover 30 for a long time. The positioning module 250 comprises a gear 251, a positioning pin 252, and a release lever 253.

The gear 251 is coaxial with the rotating shaft 40 and combines with the upper bracket in a synchronous rotation manner. The gear 251 also has a plurality of backstop gear teeth 254.

The positioning pin 252 is rotably connected to the lower bracket 220 and the locking end 256 of the positioning pin 252 is detachably blocked into the backstop gear teeth 254 to stop the rotation of the gear 251 in one direction, that is, when the ceramic cover 30 is moved upward, then the gear 251 is not blocked d by the positioning pin 252, but when the ceramic cover 30 is moved downward, then the gear 251 cannot move due to the interference of the positioning pin 252 so that the ceramic cover 30 is durably supported by the gear 251 without falling down due to the heavy weight.

The release lever 253 is disposed to one side of the positioning pin 252. When the positioned ceramic cover 30 wants to move downward again, the user can drive the positioning pin 252 by operating the release lever 253 to separate the lock end 256 from the backstop gear teeth 254 so that the ceramic cover 30 can move downward without being interfered.

The ceramic cover 30 forms a complete kamado grill with the grill body 10, and one end of the ceramic cover 30 is integrated with the upper bracket 220, then the cover hinge 20 is used to easily lift or close the ceramic cover 30 and completing the multiple opening or closing positioning of the ceramic cover 30.

The above description is only the preferred embodiments of the present invention, and not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A kamado grill with a positioning telescopic rain, comprising:
   a grill body which is a bowl-shaped structure having a first hollow portion and a bottom side opening on the sidewall of the grill body;
   a cover hinge, comprising:
      a lower bracket fixed on one side of the grill body and having a first joint end and at least one restriction slot;
      an upper bracket combined with the lower bracket through a rotating shaft, having a second joint end, and having at least one restriction unit slidably disposed in the at least one restriction slot;
      a positioning telescopic rain, comprising:
         a hydraulic rain having a hydraulic cylinder body having a first joint portion movably connected to the first joint end and a telescopic rod having a second joint portion movably connected to the second joint end;
         a damping cup ringed on the telescopic rod and being adjacent to the hydraulic cylinder body; and a spring having two ends sleeved between the second joint end and the damping cup by support of two washers; and a ceramic cover having one end integrated with the upper bracket, then the cover hinge used to complete the multiple opening or closing positioning of the ceramic cover.

2. The kamado grill as claimed in claim 1, wherein the telescopic rod has a first telescopic portion and a second telescopic portion combined with the first telescopic portion by screw thread in rotation and telescopic manner.

3. The kamado grill as claimed in claim 1, wherein the damping cup has a plurality of incisions.

4. The kamado grill as claimed in claim 1, wherein the cover hinge further includes a positioning module, comprising:

a gear which is coaxial with the rotating shaft and combines with the upper bracket in a synchronous rotation manner, and the gear having a plurality of backstop gear teeth;

a positioning pin rotatably connected to the lower bracket and having a locking end detachably blocked into the backstop gear teeth in one direction; and a release lever disposed to one side of the positioning pin.

* * * * *